United States Patent [19]

Miida

[11] 4,113,290
[45] Sep. 12, 1978

[54] PRESSURE TIGHT JOINT FOR A LARGE DIAMETER CASING

[75] Inventor: Eishiro Miida, Tokyo, Japan

[73] Assignee: Tsukamoto Seiki Co., Ltd., Tokyo, Japan

[21] Appl. No.: 835,012

[22] Filed: Sep. 20, 1977

Related U.S. Application Data

[63] Continuation-in-part of Ser. No. 730,514, Oct. 7, 1976, abandoned.

[30] Foreign Application Priority Data

Nov. 6, 1975 [JP] Japan ............................. 50-133478

[51] Int. Cl.² ............................................ F16L 25/00
[52] U.S. Cl. .................................. 285/334; 285/355
[58] Field of Search .............. 285/334, 333, 390, 355; 85/46; 403/343

[56] References Cited

U.S. PATENT DOCUMENTS

| | | | |
|---|---|---|---|
| 2,345,725 | 4/1944 | Bettis | 285/333 |
| 3,079,181 | 2/1963 | Van Der Wissel | 285/333 |
| 3,109,672 | 11/1963 | Franz | 85/46 X |
| 3,822,902 | 7/1974 | Maurer et al. | 285/333 X |
| 3,854,760 | 12/1974 | Duret | 285/334 |

Primary Examiner—Dave W. Arola
Attorney, Agent, or Firm—Wenderoth, Lind & Ponack

[57] ABSTRACT

Pipe joints for a large diameter casing, which are lowered inside an oil well or the like and are successively connected to one another, are subjected to critical conditions such as load on the casing when suspended, and pressure. A pipe joint of this class is also required to provide torque during the connecting operation and sealing capability after connection. Tooth profiles or thread configurations formed in the pipe joints welded to the intervening large diameter tubular member extend over at least three sections. In the first section, each of the external threads is engaged with each of the internal threads in such a manner that its crest and root are fully meshed to allow its butt face to abut against its back pressure face. In the second section adjacent the first section, the threads are so formed as to involve an easy transition to the thread configuration formed in the third section where the threads are so shaped that the external threads are readily meshed with the internal threads. Threaded in this manner, a pipe joint can be obtained that satisfies operative characteristics such as pressure tightness, sealing capability, and workability.

3 Claims, 4 Drawing Figures

PRESSURE TIGHT JOINT FOR A LARGE DIAMETER CASING

This is a continuation-in-part of application Ser. No. 730,514, filed Oct. 7, 1976, and now abandoned.

BACKGROUND OF THE INVENTION

This invention relates to a joint for a large diameter casing adapted to extend deeply downwardly under the ground or water for use in the drilling or oil wells, and more particularly to a joint structure or configuration which provides excellent hermetically pressure tight capability and which is suitable for connection and coupling of large diameter casings.

Tubular members of large diameter have heretofore had their tube and joint sections subjected to an excessive tension stress resulting from their own weight when the tubular members are lowered to a predetermined depth within a well or the like. Loads of 200–300 tons at maximum are applied to the tubular member when suspended, and the tubular member is required to withstand pressure of 200–300 $kg/cm^2$ per unit area in section. Thus, in the conventional joint, the connection with the tubular member must be designed to provide the maximum possible extent of thread contact. This however, may result in difficulty in connecting pipe sections. Alternatively, the joint may be constructed to allow for an easy and ready connection, but this however sacrifices sealing capability.

Successive connections of the tubular members impose an excessive torque on the joints as a result of tightening to the fullest possible extent to secure a pressure tight seal. Consequently, all of the joints may be deformed into a flat configuration and thus become unusable. Improvements on the external and internal thread configurations of such joints have been proposed to increase the yeild strength for a load on the tubular member when it is suspended. However, such proposals have failed, since the actual connecting operation leads to cross threading between the thread faces or turns. This results in cracks in the threaded portion crossing the axis of the tubular member and, contrary to reinforcing the yield strength, deteriorates the sealing capability of the joint. Accordingly, the casing is not usable over a long period of time.

SUMMARY OF THE INVENTION

The present invention eliminates the aforementioned defects inherent in the conventional pipe joint, and provides a new and useful joint structure which is conspicuous in its pressure tightness, sealing capability, and workability.

BRIEF DESCRIPTION OF THE DRAWINGS

Further objects and additional features of the invention will become apparent from the following detailed description, taken with the accompanying drawings, wherein.

DETAILED DESCRIPTION OF THE PREFERRED EMBODIMENT

Figure 1:
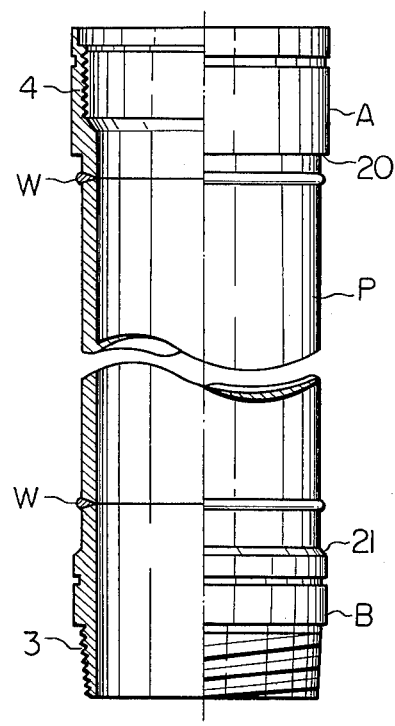
FIG. 1 is a fragmentary side elevation of a large diameter casing in longitudinal section, showing joint sections welded to each other.

Referring now to FIG. 1, there is shown a pipe section P of large diameter and adapted to be extended downwardly into a drilled well. Pipe P has attached thereto at the upper end thereof a female screw portion A and at the lower end thereof a male screw portion B, with these screw portions being firmly secured, e.g. by butt welded seams W, to the pipe section P. A unitary large diameter conductor pipe, having a length dependent on the depth of drilling, may be formed by successively joining plural pipe sections P through threaded connections of the female and male screw portions A and B from bottom to top. The female screw portion A which defines a portion of a joint element between two pipe sections P is fabricated to have at its lower end a shoulder 20 directed inwardly at a right angle. This facilitates gripping the tubular member when it is suspended. The male screw portion B, in opposition to and downwardly of the shoulder 20 of female screw portion A, is provided at its upper end with an upwardly and inwardly sloping shoulder 21.

As shown in the drawings, the joint element of the present invention is so arranged that a tubular member 1 (formed by a male screw portion B of a first pipe section P) with an external thread portion 3 formed on the exterior thereof is adapted to engage an internal thread portion 4 formed on the interior of another tubular member 2 (formed by a female screw portion A of a second pipe section P). One of the external and internal thread portions 3 and 4 is threaded and presents a tooth-shaped profile which includes at least three sections I, II, and III, each of which is different from the others in configuration.

Figure 2:
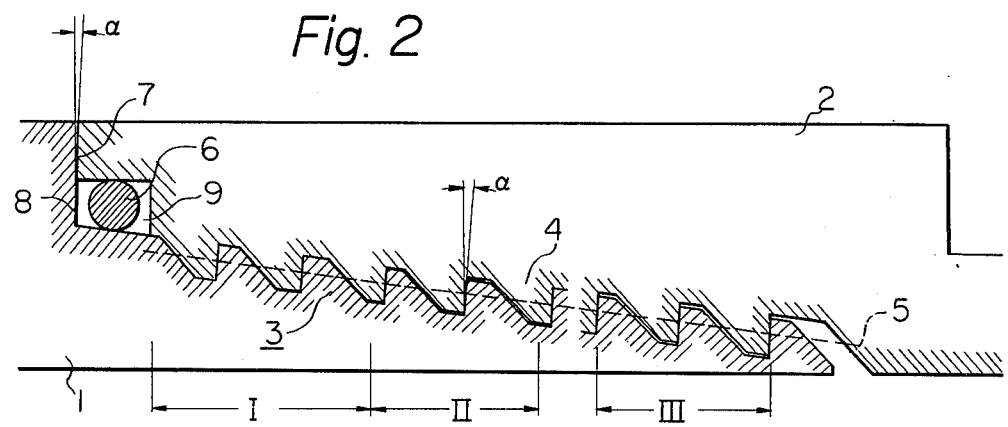
FIG. 2 is a partial sectional view showing the general configuration of the threads, in buttress form, of a joint section according to the present invention, and a threaded engagement therebetween.
Figure 4:
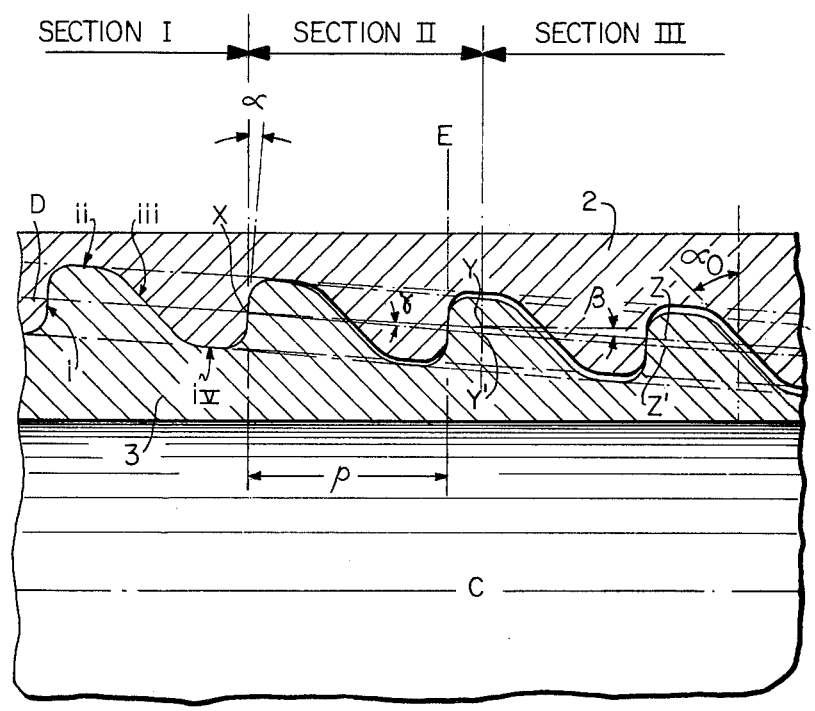
FIG. 4 is a view similar to FIG. 2, but illustrating the threads as having rounded crests and roots and also illustrating in more detail the precise structural configuration of the threads.
Figure 3:
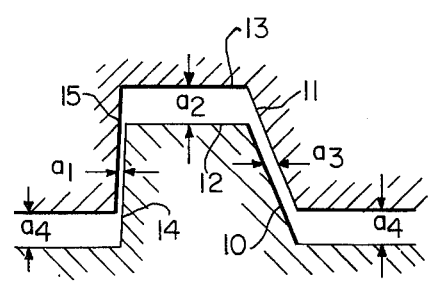
FIG. 3 is an elnarged and expanded view of the threads shown in FIG. 2, illustrating a theoretical gap between abutting butt faces.

Each of the threads may be configured in the buttress manner illustrated in FIGS. 2 and 3 or in a "rounded crest and root buttress" manner as illustrated in FIG. 4. The discussion herein will refer to the features of the invention by reference to both the buttress configuration of FIG. 2 and the "rounded buttress" configuration of FIG. 4. It is to be understood that the concept and features of the invention are equally applicable to both configurations.

In either case, butt face 14 or 15 (FIG. 3) of each of the threads when engaged with each other forms a flank angle $\alpha$ of 1°–5° with a plane perpendicular to the longitudinal axis or center line C of the tubular member. Each meshing thread also includes a crest 12 or a root 13, extending parallel to respective pitch diameter lines, and a back pressure face 10 or 11.

As shown in FIG. 4, a straight line DZ represents a pitch diameter line of the female screws of member 2. A boundary point X between the first and second sections I and II and a boundary point Y between the second and third sections II and III lie on straight line DZ. In other words, the pitch diameter line of one of the threads, i.e. of the female thread in the illustrated embodiment, is inclined at a predetermined small angle $\beta$ with respect to a center line C of the pipe. The female threads of member 2 are thus in the form of a normal tapered buttress-type thread.

On the other hand, the pitch diameter of the male screw threads within the first section I fully equals and coincides with that of the female screw threads. The male screw threads fully abut against the female screw threads at surfaces or areas *i, ii, iii* and *iv*, as will be described hereinafter.

The pitch diameter line of the male screw threads gradually moves away from the pitch diameter line of the female screw threads during the length of the second section II, i.e. along a line X—Y' inclined toward the axis C of the pipe. The pitch diameter lines X—Z and Y'—Z' of the male and female screw threads extend parallel with one another within the third section III.

As above described, the male and female screw threads are maintained in full engagement with one another at the surfaces *i–iv* within the first section I. However, in the section II the pitch diameter line of the male screw threads diverges away from that of the female screw threads at a small angle $\gamma$. This provides a gap $a_2$ between the threads of the female and male screw threads at the surface *ii*, and other gaps $a_3$ and $a_4$ therebetween at the surfaces *iii* and *iv*, respectively. These gaps may be further defined in the following.

As seen from FIG. 3, the gaps (perpendicular to the axis of the pipe P) at the surfaces *ii* and *iv* are denoted by $a_2$ and $a_4$. The gap at the abutment surface *i* and the gap at the bearing surface *iii* are designated by $a_1$ and $a_3$, respectively. This may be expressed by the following equation:

$$a_2 = a_4 = p \{\tan(\beta + \gamma) - \tan\beta\} \tag{1}$$

wherein $p$ is a length obtained from measurement of the second section starting from a boundary point of section II in the direction of the axis of the pipe (in the drawings, $p$ is the distance from a perpendicular line including X to a line E—E'), and $\beta$ is the angle of the pitch diameter line DZ to the axis C of the pipe P. $\alpha_o$ is the angle at which the bearing or back pressure face 11 is inclined to a line perpendicular to the axis C of the pipe. The relation of the gaps at the respective surfaces may be further defined as follows:

$$a_1 = a_2 \tan\alpha = p \tan\alpha \{\tan(\beta + \gamma) - \tan\beta\} \tag{2}$$

$$a_3 = a_2 \tan\alpha_o = p \tan\alpha_o \{\tan(\beta + \gamma) - \tan\beta\} \tag{3}$$

Consequently, the pitch of the male screw threads in the second section II is made larger by the gap $a_1$ when employing a normal thread cutting operation.

However, according to the present invention the screws threads are constructed so as to fully abut against one another at the abutment surface *i* (i.e. such that $a_1 = 0$). Accordingly, gaps will be provided at the respective surfaces *ii, iii* and *iv*. In order to have the screw threads abut against one another at the thread forming surface *i* in the second section II, the pitch of the male screw threads is continuously reduced by the gap $a_1$. In other words, the pitch of the male screw threads in the second section II is made smaller than in the first and third sections I and III. That is, the pitch of the male screw threads continuously varies with variation in the pitch diameter line in the second section II, i.e. diverges with respect to that in the first section I, wherein $a_2$ and $a_4$ are set, the value of $a_3$ also being set from the equation (3), and $a_1$ is continuously corrected depending thereupon. This continuous correction may be attained by varying the pitch diameter line in the second section II in such a manner that the abutment surfaces 14 and 15 of all the thread surfaces of the male and female screw threads, respectively, contact at a uniform abutment force.

The tubular member 1 has at its bottom end, adjacent the top of threaded portion 3, a relatively widely dimensioned shoulder 8 to impart to an upper end 7 of the internal threaded portion 4 of the tubular member 2 an axial impulsive force derived from a blow of a pile driver or the like exerted on the tubular member 1. The butt faces defined by the upper end 7 and the shoulder 8 form an angle equal to the flank angle $\alpha$ of the butt faces 14 and 15 of the threaded portions 3 and 4 with a plane perpendicular to the axis C of the pipe. The tubular member 2 is provided at the upper end of the internally threaded portion 4 thereof with an annular recess 9, of trapezoidal shape as shown in longitudinal section. O-rings 6, forming auxiliary seal members, of plastic material are mounted and held between the recess 9 and the exterior of the bottom end of the externally threaded portion 3.

In the section I, the externally and internally threaded portions 3 and 4 are so engaged with respect to one another that, when in fully threaded meshing engagement, the crests and roots (surfaces *ii* and *iv*), the butt faces 14 and 15 (surfaces *i*), and back pressure faces 10 and 11 (surfaces *iii*) are tightly abutted against each other. Thus, the joint structure will form an extremely tight sealing zone in cooperation with the sealing action of the O-rings 6 to thereby withstand a considerably high pressure of fluid passing through the pipe section. As mentioned above, the externally and internally threaded portions 3 and 4 in the third section III are dimensioned and configured to have a relatively large degree of clearance therebetween, so that the tubular member 1 may be smoothly inserted in the tubular member 2 without axial alignment and then turned with respect thereto for easier starting of threading.

As mentioned above, there is one clearance $a_3$ between the back pressure faces 10 and 11, and another clearance ($a_2$ or $a_4$) between the crests 12 and the roots 13. The threads in the second section II provide a progressive change from the wholly meshed threads of section I to the loosely meshed threads of section III. That is, in section II the clearances between the back pressure faces 10 and 11 and between crests 12 and roots 13 gradually enlarge from the first section I to the third section III.

In the past, threading to obtain the successively varying thread configurations such as in section II would have been practically difficult. However, recent developments in numerical control of machine tools enable the use of mechanical machining to obtain joints in which the thread configurations successively and ungradually vary. This invention makes practical use of such development to obtain a thread joint having the thread configurations of second section II.

According to the embodiment as set forth hereinbefore, the tapered external and internal threads in the third section III, which extend along about one-third of the entire thread length, are threadedly meshed with each other to have a relatively great clearance therebetween to thereby facilitate a rapid and ready tightening operation. The first section I has a length equal to at least two turns of the threads to achieve a tight engagement of the respective threads and to maintain the joint structure safe and stable. This arrangement will continuously and hermetically withstand heat and pressure, even when used in an oil well which extends downwardly to a great depth. In addition, the threads in the second section II, i.e. "transition" section, which also extends along about one-third of the entire thread length, enable the joint to be tightly and threadedly connected. The external and internal threaded portions have butt faces 14 and 15, respectively, which form the flank angle α of 1°–5°, preferably about 2°, with a plane perpendicular to the axis C of the tubular member, and are strong enough to withstand or resist forces of axial compressive stress generated in the thread faces during connection of the pipes.

The internal portion 4 is tapered and diminished in size, and the end portion 7 thereof is thinner than the bottom end 8 of the external threaded portion 3. However, cracking of portion 7 due to compressive stress derived from threading torque, fluid pressure when the pipe is lowering in a well, or impact of the pipe on a hard stratum is avoided due to the presence of the flank angle α between the faces 7 and 8.

The threaded joint structure of the present invention affords strength enough to avoid chipping of the threads even if the structure is subjected to tensile stress resulting from the great weight of plural suspended pipe sections when the latter are joined together from the bottom to the top while moving downwardly into a deep well. Thus, the joint structure of the present invention provides an excellent practically workable connection. With a relatively small torque, the butt faces and the threads formed in the first section I are fully and tightly held against each other to obtain a pressure tight seal, such that the connection is highly practical.

Although the invention has been described with reference to specific embodiments, it is apparent that many modifications may be made by one skilled in the art without departing from the scope of the invention. For instance, the threads may be divided into more sections than the three sections I, II, and III shown and described.

What is claimed is:

1. A pressure tight pipe joint for a large diameter pipe casing, said pipe joint comprising:
    a first pipe member having internal threads;
    a second pipe member having external threads;
    said internal threads and said external threads each being in the form of buttress-type threads and including alternative crests and roots separated alternately by butt faces and back pressure faces;
    one of said internal threads and said external threads being tapered and having a continuous and straight pitch diameter line inclined at an angle to the longitudinal axis of said pipe members;
    the other of said internal threads and said external threads being divided into at least three tapered sections;
    a first said section having a pitch diameter line coinciding with said continuous pitch diameter line of said one thread, such that said crests, roots, butt faces and back pressure faces of said first section fully contact respective faces of said one thread;
    a second said section having a pitch diameter line diverging from said continuous pitch diameter line of said one thread, such that said butt faces of said second section contact respective butt faces of said one thread, but that said roots and crests and said back pressure faces of said second section are spaced from respective said crests and roots and said back pressure faces of said one thread; and
    a third said section having a pitch diameter line which is parallel to but spaced from said continuous pitch diameter line of said one thread, such that said butt faces of said third section contact respective butt faces of said one thread, but that said roots and crests and said back pressure faces of said third section are spaced from respective said crests and roots and said back pressure faces of said one thread.

2. A pipe joint as claimed in claim 1, wherein said butt faces are inclined at an angle of from 1° to 5° to a plane extending perpendicular to said longitudinal axis.

3. A pipe joint as claimed in claim 1, wherein said one thread comprises said internal thread, and said other thread comprises said external thread.

* * * * *